(12) United States Patent
Chapel et al.

(10) Patent No.: US 6,356,611 B1
(45) Date of Patent: Mar. 12, 2002

(54) BIT RATE CONTROL INTERFACE FOR THE RECORDING AND/OR READING OF DIGITAL DATA

(75) Inventors: Claude Chapel, Rennes; Jean-Yves Quintard, Betton; François Bourdon, Rennes, all of (FR)

(73) Assignee: Thomson Licensing S.A., Boulogne, Cedex (FR)

( * ) Notice: Subject to any disclaimer, the term of this patent is extended or adjusted under 35 U.S.C. 154(b) by 0 days.

(21) Appl. No.: 09/044,443

(22) Filed: Mar. 19, 1998

(30) Foreign Application Priority Data

Mar. 28, 1997 (FR) ............................................. 97 03817

(51) Int. Cl.[7] ............................................. H04L 25/40
(52) U.S. Cl. ........................................ 375/372; 370/505
(58) Field of Search ........................... 375/372; 370/505, 370/516, 517, 519

(56) References Cited

U.S. PATENT DOCUMENTS

| | | | | |
|---|---|---|---|---|
| 4,718,074 A | * | 1/1988 | Mannas et al. ............... | 375/120 |
| 4,759,041 A | * | 7/1988 | Anderson et al. ............ | 375/118 |
| 5,007,070 A | * | 4/1991 | Chao et al. ................... | 375/120 |
| 5,027,351 A | | 6/1991 | De Prycker et al. .......... | 370/94 |
| 5,486,784 A | * | 1/1996 | Eriksson ....................... | 327/165 |
| 5,534,929 A | * | 7/1996 | Tanaka ......................... | 348/405 |
| 5,566,208 A | * | 10/1996 | Balakrishnan ............... | 375/240 |
| 5,708,686 A | * | 1/1998 | Assus et al. .................. | 375/372 |
| 5,742,400 A | * | 4/1998 | Satoh ........................... | 358/262 |
| 5,754,241 A | * | 5/1998 | Okaka et al. ................. | 348/419 |
| 6,097,876 A | * | 9/2000 | Ohishi et al. ................. | 386/67 |
| 6,115,537 A | * | 9/2000 | Yamada et al. .............. | 386/109 |
| 6,124,999 A | * | 9/2000 | Yamamoto .................... | 360/69 |

FOREIGN PATENT DOCUMENTS

| | | | | |
|---|---|---|---|---|
| EP | 0560020 | | 9/1993 | ............. G06F/9/38 |
| EP | 98400677 | | 7/1998 | |
| GB | 2304501 A | | 3/1997 | ............. H04J/3/12 |

OTHER PUBLICATIONS

IBM Technical Disclosure Bulletin, vol. 36, No. 10 Oct. 1, 1993 pp. 569–570 Programmable High Performance Memory Buffer.

Civanlar M R Et Al. "A Practical system for MPEG–2–based video–on–demand over ATM packet networks and the WWW" Signal Processing Image Communication, vol. 8, No. 3 Apr. 1996, pp. 221–227.

* cited by examiner

Primary Examiner—Stephen Chin
Assistant Examiner—Dac V. Ha
(74) Attorney, Agent, or Firm—Joseph S. Tripoli; Ronald H. Kurdyla

(57) ABSTRACT

A control interface for the bit rate of digital data to be recorded as well as a control interface for the bit rate of digital data emanating from a reading device, particularly when the digital data constitutes a high bit rate uninterrupted data stream such as a video data stream in the MPEG II format. Each control interface comprises a memory circuit for storing the data to be recorded or to be read and a device for storing the data to be recorded or read in the memory circuit so as to fill the memory circuit to a predetermined level. The storing device includes a gauge for generating an information item giving the fill level of the memory.

16 Claims, 1 Drawing Sheet

BIT RATE CONTROL INTERFACE FOR THE RECORDING AND/OR READING OF DIGITAL DATA

BACKGROUND OF THE INVENTION

The invention relates to the recording and/or reading of a digital data stream.

The invention applies more particularly to the case where the data stream is a high bit rate uninterrupted stream such as, for example, a data stream in the MPEG II format.

The recording and reading of digital data can be performed either with the aid of digital recorders, or with the aid of digital video recorders.

As will become apparent in the remainder of the description, the invention finds a particularly advantageous application with regard to the recording and reading of digital data with the aid of digital video recorders. However, the invention applies equally to the recording and reading of digital data with the aid of digital recorders.

SUMMARY OF THE INVENTION

Thus, the invention relates to an interface for controlling the bit rate of digital data to be recorded. The control interface comprises at least one memory circuit for storing the data to be recorded and means whereby the data to be recorded can be stored in the memory circuit in such a way as to fill the memory circuit to a predetermined level under the action of a write command, of a read command and of a reset to zero command for a level indicator of the memory circuit, these commands being applied to the memory circuit.

Similarly, the invention relates to an interface for controlling the bit rate of digital data emanating from a reading device. The control interface comprises at least one memory circuit for storing the data to be read and means whereby the data to be read can be stored in the memory circuit in such a way as to fill the memory circuit to a predetermined level under the action of a write command, of a read command and of a reset to zero command for a fill level indicator for the memory circuit, these commands being applied to the memory circuit.

The invention also relates to a digital data recording system consisting of a control interface for the bit rate of data to be recorded and of a device for recording the digital data emanating from the control interface. The interface for controlling the bit rate of the data to be recorded is an interface such as that according to the invention mentioned above.

The invention also relates to a digital data reading system consisting of a device for reading digital data and a control interface for the bit rate of the digital data emanating from the reading device. The control interface for the bit rate of the digital data emanating from the reading device is a control interface such as that according to the invention mentioned above.

The invention also relates to a digital data recording/reading system comprising a control interface for the bit rate of digital data to be recorded, a recording/reading device and a control interface for the bit rate of digital data emanating from the recording/reading device. The control interface for the bit rate of digital data to be recorded is a control interface such as that according to the invention mentioned above and the control interface for the bit rate of the digital data emanating from the recording/reading device is an interface such as that according to the invention mentioned above.

BRIEF DESCRIPTION OF THE DRAWING

So as not to unnecessarily burden the description, the invention will be described with the aid of a single FIGURE representing a recording/reading system according to the preferred embodiment of the invention.

DESCRIPTION OF THE PREFERRED EMBODIMENT

Figure 1:
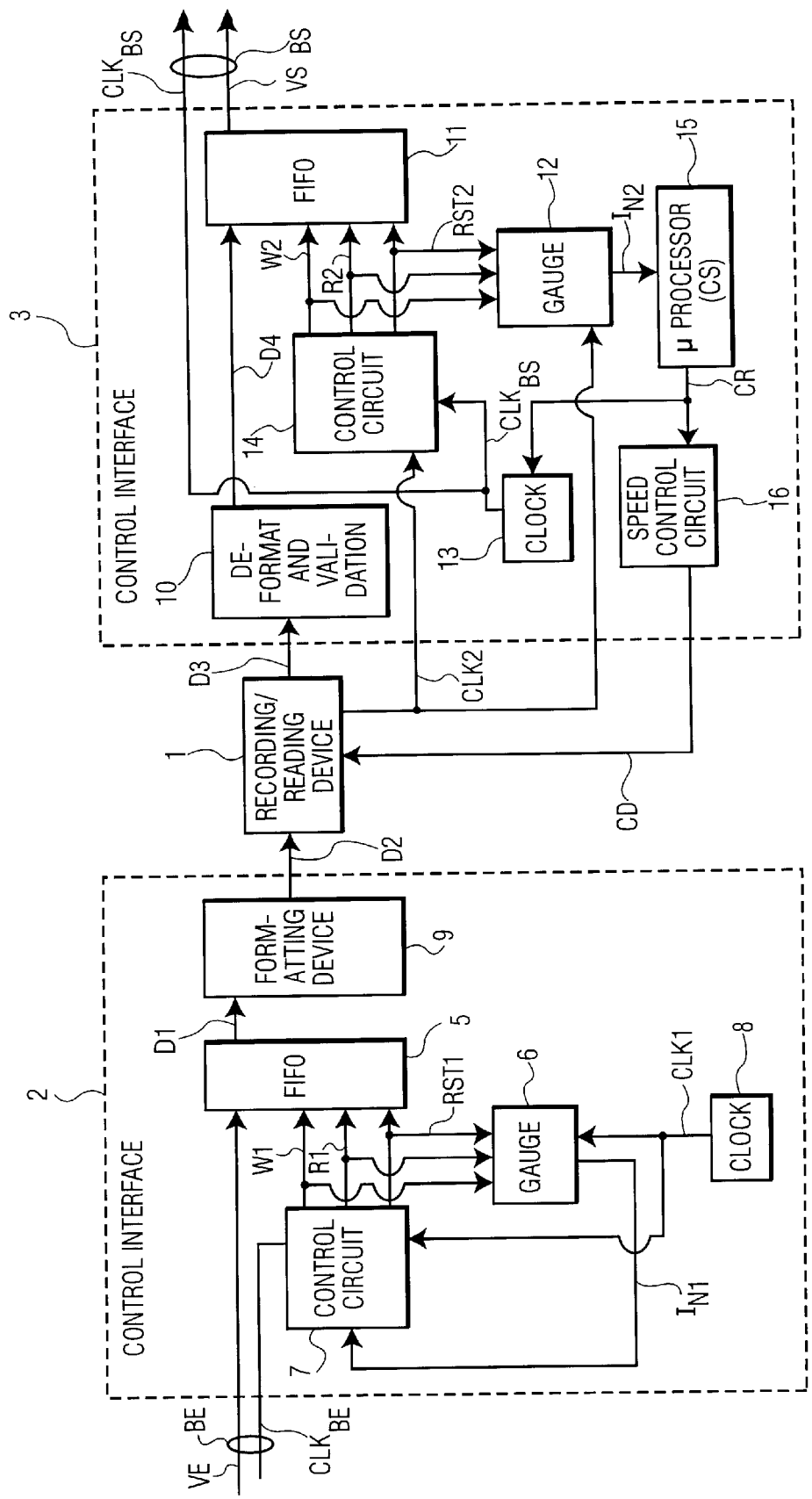

The recording/reading system according to the invention consists of a recording/reading device 1, a control interface 2 for the data to be recorded and a control interface 3 for the data read emanating from the recording/reading device.

According to the invention, the recording/reading device is a digital recorder or a digital video recorder. Preferably, the recording/reading device is a digital video recorder.

According to the preferred embodiment of the invention, the digital data recorded or read are video data in the MPEG II format. However, more generally the invention relates to a recording/reading system for digital data of any type of format.

The control interface 2 for the data to be recorded is composed of an FIFO-type memory 5, a gauge 6, a control circuit 7, a clock device 8 and a formatting device 9.

The digital video data VE to be recorded travel over a databus BE which, as is known to a person skilled in the art, additionally conveys the clock signal $CLK_{BE}$ accompanying the video data VE.

The video data VE are transferred to the input of the FIFO-type memory 5 and the clock signal $CLK_{BE}$ is applied to the control circuit 7 which, consequently, is synchronized with the video data stream VE.

The device 8 generates a clock signal CLK1 which is applied to the gauge 6 and to the control circuit 7. The clock CLK1 is the internal clock of the control interface 2. The application of the clock signal CLK1 to the gauge 6 and to the control circuit 7 is intended to ensure synchronous operation of the gauge 6 and of the control circuit 7.

By way of example, for video data in the 4:2:2 format, the frequency of the clock signal CLK1 is substantially equal to 27 MHz.

The control circuit 7 generates 3 control signals W1, R1 and RST1 which are applied, on the one hand, to the memory 5 and, on the other hand, to the gauge 6. The signal W1 is a command which enables the writing of the data VE to the memory 5. The signal R1 is a command which enables the extraction of the data stored in the memory 5. The signal RST1 is a command for resetting the pointer of the memory 5 to zero. As is known to a person skilled in the art, the pointer of an FIFO-type memory is an indicator of the fill level of the memory.

The operation of the control device 2 comprises two phases: a transient phase and a steady-state phase.

During the transient phase, the signal RST1 sets to zero the pointer of the memory 5 and the level indicator of the gauge 6.

After setting the pointer of the memory 5 to zero, the write command W1 applied to the memory 5 enables the writing of the data VE to the memory 5 so that the latter reaches a predetermined fill level N1.

According to the preferred embodiment of the invention, for which the video data VE are data in the MPEG II format, in the case where, for example, the memory capacity of the FIFO-type memory 5 is 32 N kbytes, the predetermined fill level N1 of the memory 5 is substantially equal to half the memory capacity of the memory 5.

Having reached the predetermined fill level, the transient phase is complete and the steady-state phase begins.

The steady-state phase consists in permitting the data contained in the memory 5 to be transmitted from the memory 5 to the formatting device 9 provided that the fill level of the memory 5 remains substantially the predetermined fill level mentioned earlier.

To this end, the gauge 6 generates an information item $I_{N1}$, the purpose of which is to give the fill level N1 of the memory 5 accurately. The information item $I_{N1}$ is a binary word. Preferably, the information item $I_{N1}$ is a binary word of 15 bits. The number of different combinations which the binary word $I_{N1}$ may take is then equal to 32 kbytes. Advantageously, the state of fill of the memory 5 can then be given with the greatest possible accuracy.

The information item $I_{N1}$ is applied to the control circuit 7.

Under the action of the information item $I_{N1}$, the control circuit 7 makes it possible, with the aid of commands W1 and R1 which it generates, for the fill level of the memory 5 to remain substantially equal to the predetermined fill level.

When the control circuit is made to halt the reading of the data, the recording device 1 records dummy data blocks. The dummy data make it possible to ensure the continuity of the signal to be transmitted.

The term dummy data should be understood to mean data which contain no useful video information item to be recorded. By way of examples, the dummy data may be either self-test data, in the case in which a self-test function is provided in order to verify that the recording conditions are correct, or data which reproduce the latest recorded data emanating from the memory 5. In order to be recognized during reading, the dummy data blocks include a particular header.

According to the preferred embodiment of the invention, the recording device 1 is a digital video recorder which records the data in the form of successive frames.

When the number of kbytes representing an image frame has been recorded, the digital video recorder records blocks of dummy data such as the data mentioned above.

The gauge 6 is, for example, a forward/backward counting circuit: the command W1 initiates forward counting, the command R1 initiates backward counting and the command RST1 initiates resetting to zero of the counter.

The formatting device 9 makes it possible to put the data D1 emanating from the memory 5 into the format of the recording device 1. The data D2 emanating from the formatting device 9 are then transmitted to the recording device 1. By way of example, a recording format may be the 4:2:2 format.

The control interface 3 for the recorded data emanating from the recording/reading device 1 comprises a deformatting and validation device 10, an FIFO-type memory 11, a gauge 12, a clock device 13, a control circuit 14, a microprocessor 15 and a circuit 16 for controlling the playing speed of the medium read by the recording/reading device 1.

As mentioned earlier, the recorded data are put into the format required by the recording device 1. Conversely, the data D3 emanating from the recording/reading device 1 are deformatted by the device 10.

According to the invention, the purpose of the device 10 is also to select the valid data contained in the data stream D3. The valid data are selected on the basis of their header. The deformatted data validated as useful data D4 emanating from the device 10 are transmitted to the memory 11.

The clock device 13 generates the clock signal $CLK_{BS}$ accompanying the video data VS emanating from the memory 11. The video data VS and the clock signal $CLK_{BS}$ travel over the output bus BS.

The clock signal $CLK_{BS}$ is applied to the control circuit 14.

The clock signal CLK2 of the control interface 3 is applied to the control circuit 14 and to the gauge 12. Preferably, the clock signal CLK2 emanates from the recording/reading device 1. By way of example, for video data in the 4:2:2 format, the frequency of the clock signal CLK2 is substantially equal to 27 MHz.

The control circuit 14 generates 3 control signals W2, R2 and RST2 which are applied, on the one hand, to the memory 11, and, on the other hand, to the gauge 12.

The signal W2 is a command which enables the writing of the data D4 to the memory 11. The signal R2 is a command which enables the extraction of the data stored in the memory 11. The signal RST2 is a command allowing the pointer of the memory 11 to be reset to zero.

Just like the control device 2, the control device 3 operates according to a transient phase and a steady-state phase.

During the transient phase, the signal RST2 sets to zero the pointer of the FIFO-type memory 11 and the level indicator of the gauge 12.

After setting the pointer of the memory 11 to zero, the write command W2 applied to the memory 11 enables the writing of the data D4 to the memory 11 so that the latter reaches a predetermined fill level N2.

According to the preferred embodiment of the invention, the memory capacity of the memory 11 is identical to the memory capacity of the memory 5. It follows that the predetermined fill level N2 is, preferably, substantially equal to half the memory capacity of the memory 11.

When the predetermined fill level is reached, the steady-state phase begins. In the steady state, the data D4 are written to the memory 11 at the frequency of the clock signal $CLK_{BS}$ emanating from the clock device 13. Preferably, the frequency of the clock signal $CLK_{BS}$ is identical to the frequency of the clock signal $CLK_{BE}$.

The gauge 12 is, for example, a forward/backward counting circuit: the command W2 initiates forward counting, the command R2 initiates backward counting and the command RST2 initiates resetting to zero of the counter.

The gauge 12 generates an information item $I_{N2}$ which gives the state of fill of the memory 11. Like the information item $I_{N1}$, the information item $I_{N2}$ is preferably a binary word of 15 bits allowing the greatest possible accuracy for the state of fill of the memory 11. The changes in the state of fill of the memory 11 can then be followed with very high accuracy.

The information item $I_{N2}$ is applied to the microprocessor 15 in a sampled manner at regular time intervals. Preferably, the application of the information item $I_{N2}$ to the microprocessor 15 is performed in tempo with the frame period. It follows that each frame of order k has its bit rate controlled on the basis of the calculated bit rate for the frame of order k-1.

The microprocessor 15 calculates the mean value of the bit rate of the data VS emanating from the memory 11 on the basis of the sampled information item $I_{N2}$.

The microprocessor 15 has a set-point value CS in memory which represents the desired nominal bit rate for the data VS.

The microprocessor 15 compares the calculated mean value of the bit rate of the data VS with the set-point value CS and calculates a correction signal CR which is applied to the circuit 16 for controlling the playing speed of the medium read by the recording/reading device 1.

Under the action of the correction signal CR, the circuit 16 for controlling the playing speed of the medium read generates a control signal CD which is applied to the circuit which controls, inside the device 1, the playing speed of the medium read.

Advantageously, the speed of reading the medium is then controlled directly via the bit rate of the stream of data VS emanating from the control interface 3.

A medium which has been recorded at a place where the local clock CLK1 which regulated the recording of the data has a substantially different frequency from the local clock CLK2 which regulates reading, can then be read without distortion. By way of example, the margin within which the frequency of the clocks CLK1 and CLK2 may vary is plus or minus 10 ppm, i.e. plus or minus 270 Hz around 27 MHz.

Moreover, on account of the very high accuracy with which the state of fill of the memory 11 can be followed, the control loop for the speed of the reading system advantageously exhibits very high stability.

According to an enhancement of the invention, the correction signal CR is also applied to the clock device 13.

Generally, the frequency of the clock signal $CLK_{BS}$ is fixed using a quartz oscillator. According to the enhancement mentioned above, the control of the playing of the read medium can be enhanced by modifying the frequency of the clock $CLK_{BS}$ under the action of the signal CR applied to the device 13. To this end, the clock device 13 comprises means whereby the frequency of the clock signal $CLK_{BS}$ may be modified. These means are means known to a person skilled in the art. It is therefore unnecessary to recall them here.

Preferably, modification of the frequency of the clock signal $CLK_{BS}$ under the action of the correction signal CR is implemented in the case where the filling or emptying of the memory 11 is such that the data bit rate can no longer be correctly ensured solely under the action of the control signal CD applied to the control circuit internal to the recording/reading device.

What is claimed is:

1. Reading system comprising:
    a reading device including a storing medium working at a playing speed, and
    an interface for reading digital data from the reading device, said interface including:
        at least one memory circuit for storing the data to be read, the memory circuit responding to control commands,
        a deformatting circuit for deformatting the data emanating from the reading device and for selecting and transmitting to the memory circuit the valid data,
        a control circuit providing the control commands for the memory circuit,
        means for controlling the playing speed in such a way as to maintain the fill level of the memory circuit around a predetermined level.

2. The system of claim 1, wherein said means comprises:
    a clock circuit making it possible to generate a clock signal accompanying the digital data output by the memory circuit,
    a gauge making it possible to generate an information item giving the fill level of the memory circuit under the action of the control commands,
    a microprocessor receiving the information item and calculating the mean value of the bit rate of the data emanating from the memory, the microprocessor comparing said mean value with a set-point value so as to calculate a correction signal,
    a speed control circuit receiving the correction signal and generating a control signal to the reading device, the control signal controlling the playing speed of the medium on which the digital data are stored.

3. The system according to claim 2, wherein the memory circuit is an FIFO-type memory, wherein the gauge is a forward/backward counting circuit and wherein the information item giving the fill level of the memory circuit is a binary word.

4. The system according to claim 3, wherein the memory circuit has a memory capacity of 32 Kbytes and wherein the binary word is a word of 15 bits.

5. The system according to claim 2, wherein the clock circuit comprises means such that the frequency of the clock signal which it generates may be modified under the action of the correction signal.

6. The system according to claim 1, wherein the reading device is a digital video recorder.

7. The system according to claim 1, wherein the reading device is a digital recorder.

8. A recording/reading system comprising:
    a recording/reading device including a storing medium working at a playing speed,
    an interface for recording digital data in the recording/reading device, said interface including:
        at least one first memory circuit for storing the data to be recorded, the first memory circuit responding to first control commands,
        a formatting circuit that puts the data read from the first memory circuit into the format of the recording/reading device, and
        a first control circuit providing the first control commands for the first memory circuit in such a way as to maintain the fill level of the first memory circuit around a predetermined level, and
    an interface for reading digital data from the recording/reading device, said interface including:
        at least one second memory circuit for storing the data to be read, the second memory circuit responding to second control commands,
        a deformatting circuit for deformatting the data emanating from the recording/reading device and for selecting and transmitting to the second memory circuit the valid data,
        a second control circuit providing the second control commands for the second memory circuit,
        means for controlling the playing speed in such a way as to maintain the fill level of the second memory circuit around a predetermined level.

9. The system according to claim 8, wherein the recording/reading device is a digital video recorder.

10. The system according to claim 8, wherein the recording/reading device is a digital recorder.

11. The system of claim 8 wherein formatting circuit comprises means for providing dummy data to the recording device in response to a command of the first control circuit.

12. The system according to claim 8, wherein the recording interface further comprises a first gauge making it possible to generate a first information item which gives the fill level of the first memory circuit under the action of the first control commands, the first information item being applied to the first control circuit.

13. The system according to claim 12, wherein the first memory circuit is an FIFO-type memory, wherein the first gauge is a forward/backward counting circuit and wherein the first information item giving the fill level of the first memory circuit is a binary word.

14. The system of claim 8, wherein said controlling means comprises:
- a clock circuit making it possible to generate a clock signal accompanying the digital data output by the second memory circuit,
- a second gauge making it possible to generate a second information item giving the fill level of the second memory circuit under the action of the second control commands,
- a microprocessor receiving the second information item and calculating the mean value of the bit rate of the data emanating from the second memory circuit, the microprocessor comparing said mean value with a set-point value so as to calculate a correction signal,
- a speed control circuit receiving the correction signal and generating a control signal to the recording/reading device, the control signal controlling the playing speed of the medium on which the digital data are stored.

15. The system according to claim 14, wherein the second memory circuit is an FIFO-type memory, wherein the second gauge is a forward/backward counting circuit and wherein the second information item giving the fill level of the second memory circuit is a binary word.

16. The system according to claim 14, wherein the second memory circuit is an FIFO-type memory, wherein the second gauge is a forward/backward counting circuit and wherein the second information item giving the fill level the second memory circuit is a binary word.

* * * * *